(12) United States Patent
Reiser

(10) Patent No.: US 7,544,962 B2
(45) Date of Patent: Jun. 9, 2009

(54) METHOD FOR READING OUT INFORMATION STORED IN A PHOSPHOR LAYER

(75) Inventor: Georg Reiser, Munich (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 140 days.

(21) Appl. No.: 11/186,642

(22) Filed: Jul. 21, 2005

(65) Prior Publication Data

US 2006/0022157 A1 Feb. 2, 2006

(30) Foreign Application Priority Data

Jul. 29, 2004 (EP) .................... 04103650

(51) Int. Cl.
*G01T 1/105* (2006.01)
(52) U.S. Cl. ...................... 250/585; 250/584
(58) Field of Classification Search .......... 250/584, 250/585

See application file for complete search history.

(56) References Cited

U.S. PATENT DOCUMENTS

| | | | |
|---|---|---|---|
| 4,922,103 A | 5/1990 | Kawajiri et al. | |
| 6,064,755 A * | 5/2000 | Some | 382/132 |
| 6,642,535 B2 | 11/2003 | Gebele et al. | |
| 6,858,861 B2 | 2/2005 | Gebele et al. | |
| 7,161,166 B2 * | 1/2007 | Yasuda | 250/584 |
| 7,176,465 B2 * | 2/2007 | Kerr et al. | 250/361 R |
| 2001/0045535 A1 | 11/2001 | Yasuda | |
| 2004/0094730 A1 * | 5/2004 | Imai et al. | 250/584 |
| 2004/0188646 A1 | 9/2004 | Lind et al. | |
| 2004/0188647 A1 | 9/2004 | Lind et al. | |
| 2004/0232365 A1 | 11/2004 | Reiser et al. | |
| 2004/0238765 A1 | 12/2004 | Bode et al. | |
| 2004/0238766 A1 | 12/2004 | Bode et al. | |
| 2004/0239998 A1 | 12/2004 | Reiser | |
| 2005/0092943 A1 | 5/2005 | Nitsche et al. | |

FOREIGN PATENT DOCUMENTS

EP 1503241 2/2005

* cited by examiner

*Primary Examiner*—David P Porta
*Assistant Examiner*—Carolyn Igyarto
(74) *Attorney, Agent, or Firm*—Houston Eliseeva, LLP

(57) ABSTRACT

In a method for reading out information stored in a phosphor layer whereby the phosphor layer is stimulated into emitting emission light by stimulation light produced from a light source, the emission light emitted from one or several areas of the phosphor layer is collected by a detector moved relative to the phosphor layer, and then converted into corresponding emission light signals. In order to improve the signal/noise ratio, the light source is momentarily switched off at least once during the movement of the detector relative to the phosphor layer. When the light source is switched off, a background, which is caused by the ambient light and/or dark currents in the detector, is collected by the detector and converted into a corresponding background signal. The background signal is then used for correcting the emission light signals.

12 Claims, 2 Drawing Sheets

METHOD FOR READING OUT INFORMATION STORED IN A PHOSPHOR LAYER

The invention relates generally to an improved method for reading out information stored in a phosphor layer.

BACKGROUND OF THE INVENTION

Methods of this type are used in particular for medical purposes in the field of computer radiography (CR). X-ray pictures in so-called storage phosphors are characterised here in that the X-ray radiation passing through an object, for example a patient, is stored as a latent picture in a storage phosphor layer. In order to read out the stored picture, the storage phosphor layer is irradiated with stimulation light, and so stimulated into emitting emission light, the intensity of which is dependent upon the respectively stored picture information. The emission light is collected by an optical detector and converted into electric signals which are further processed as required, and can be shown on a monitor or displayed on a corresponding display unit, such as a printer.

EP 1 319 963 A1, herein incorporated by reference in its entirety for background information only, describes a method wherein a detector is moved over a phosphor layer, whereby the emission light emitted from individual linear areas of the phosphor layer is collected. The collection of the emission light emitted from a linear area happens over an adjustable integration period. Due to the continuous feed of the detector during the integration period, the width of this area in the feed direction is determined by the integration period. In particular with low intensities of emission light, a longer integration period is set so as to increase the width of the linear areas. In this way the portion of so-called read-out noise on the detector signal is reduced, and consequently the signal/noise ratio can be improved.

It has, however, become apparent that a longer integration period does not lead to a better signal/noise ratio in all applications. On the contrary, in certain cases the noise can increase in relation to the signal of the emission light emitted over the integration period, and this results in an overall worse signal/noise ratio.

It is the aim of the invention to provide a method for reading out information stored in a phosphor layer whereby the signal/noise ratio is improved.

SUMMARY OF THE INVENTION

The above and other problems are solved by a method where a light source is momentarily turned off at least once during a movement of a light detector relative to a phosphor storage layer, and with the momentarily turned off light source, a background is created by the ambient light and/or dark currents in the detector, which are collected by the detector and converted into a corresponding background signal. The background signal is then used for correcting the emission light signals that were derived from the emission light collected.

The invention is based on the idea of taking one or more so-called dark measurements over individual areas or sections of the phosphor layer in addition to collecting the emission light during movement of the detector. When taking the dark measurements a background is respectively determined when the light source is momentarily switched off. The background is created, for example, by ambient light, dark currents in the detector or other interference such as the so-called read-out noise, and over which emission light signals obtained by the collection of the emission light are superimposed. The emission light signals are then corrected by using the background signals obtained by the dark measurements, whereby the influence of the background is eliminated when collecting the emission light. Due to the dark measurements taken during movement of the detector over the individual areas of the phosphor layer, it is guaranteed that the respective background spatially close to the respective individual areas of the phosphor layer to be read out is collected. In this way, ambient light influences in particular can be eliminated with a high level of accuracy.

Consequently, with the method in accordance with the invention, the signal/noise ratio is improved in relation to the methods established by the prior art. In particular, interference and portions of noise resulting from the ambient light are eliminated with a particularly high degree of reliability.

With a preferred further development of the method, it is proposed that the background is collected by the detector during a background integration period which is shorter than a feed period for the movement of the detector by the width of an area of the phosphor layer in the feed direction of the detector. It is in this way that the background is collected while the detector moves over a section of an area of the phosphor layer to be read out. In this way, the correction of the emission light emitted from this area and collected is particularly accurate.

Preferably, the emission light emitted from an area or section of the phosphor layer is collected by the detector during an integration period, whereby the sum of the background integration period and the integration period is less than or the same as the feed period. Thus, in two subsequent measurements, in other words two measurements which are as close as possible with regard to time and location, both the emission light emitted from an area and the background present in this area are collected. At the same time, the portion of the so-called dark noise is kept low on the emission light signal. The signal to noise ratio is in this way further improved overall.

Advantageously, the integration period and the background integration period are the same. In this way the background signal obtained also quantitatively reproduces the background portions also collected when collecting the emission light. The background signal can then be directly used for correcting the respective emission light signals. If the integration period and the background integration period are of different duration, however, the latter must be converted to the corresponding duration of the integration period, so that the generally differing strong influence of the background with different integration periods can be taken into consideration.

It is also preferred that an area of the phosphor layer is stimulated into emitting emission light during a stimulation period, whereby the stimulation period is shorter or the same as the integration period. This makes it easy to control the switching on and switching off of the light source and the detector. Moreover, it is prevented, in particular by a stimulation period which is shorter then the integration period, that a so-called afterglow of the phosphor layer occurring when the light source has been switched off is also wrongly collected during collection of the background. In this way, a high signal/noise ratio of the emission light signals is guaranteed with a high degree of reliability.

Preferably, the detector and/or the light source are moved relative to the phosphor layer with a constant feed speed. In this way, a high level of read-out accuracy which can be reproduced easily is achieved. The feed period for the movement of the detector by the width of an area of the phosphor layer corresponds here to the quotient from the width of an area and the feed speed.

It is also preferred that the areas of the phosphor layer are respectively in the form of a line, whereby the detector and/or the light source are moved perpendicularly to the longitudinal extension of the line relative to the phosphor layer. In this way, all of the information stored in a line of the phosphor layer is collected in one go within the respectively set integration period of the detector, so that the phosphor layer can be read out particularly quickly. This applies correspondingly for the collection of the respective background.

In a further preferred embodiment of the method in accordance with the invention, it is proposed that the collection of the background and/or the collection of the emission light is controlled by a pulse signal, whereby the background integration period or the integration period is given by the respective pulse width of the individual pulses of the pulse signal. It is thus simple to control the collection of the background or emission light.

Preferably a periodic pulse signal, in particular with rectangular pulses, is used as a pulse signal. The periodic duration of the pulse signal is chosen here such that it corresponds to half the feed period of the detector. Within the feed period, during the first period the stimulation and collection of the emission light takes place, and during the second period, collection of the background with the light source switched off takes place. The sequence of the collection of the emission light and the background can, however, be inverted.

In a further variation of the method in accordance with the invention it is proposed that, with a movement of the detector by several widths in the feed direction, the background is collected several times, and is thus converted into several corresponding background signals from which an average background signal is deduced. The average background signal is then used to correct the emission light signals from one or more individual areas of the phosphor layer. Based upon the average, noise portions in the average background signal are considerably reduced in relation to the noise portions in the individual background signals. In this way the correction of the emission light signals can be made with a particularly high level of accuracy.

BRIEF DESCRIPTION OF THE DRAWINGS

Further features and advantages of the invention can be found in the following description of preferred embodiments and applications given as examples, whereby reference is made to the attached drawings. The illustration of the embodiments provided here is not to scale.

DETAILED DESCRIPTION OF THE PREFERRED EMBODIMENTS

Figure 1:
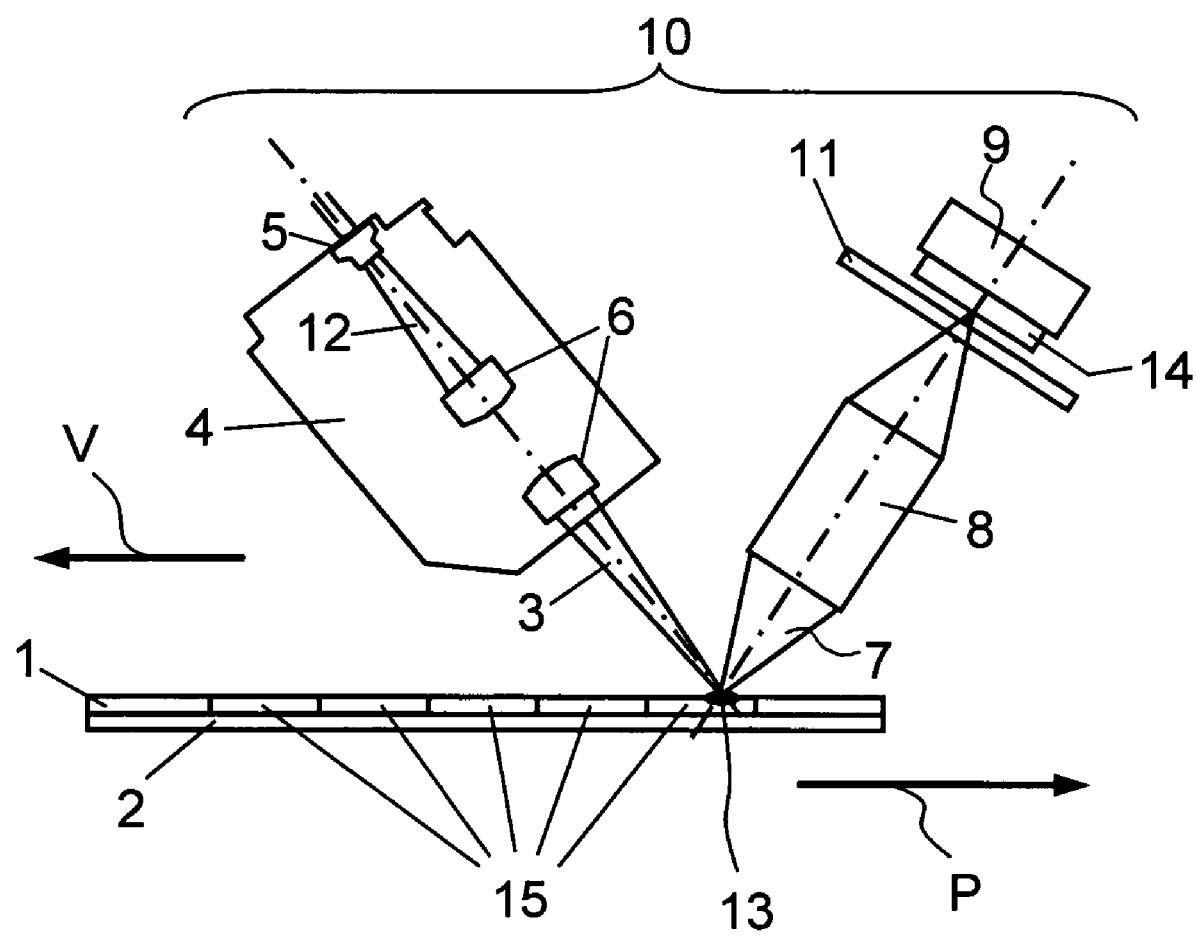
FIG. 1 shows a device for implementing the method in accordance with the invention.

FIG. 1 shows a device for implementing the method in accordance with the invention. A phosphor layer 1 to be read out is positioned on a support layer 2 and is irradiated with stimulation light 3 which is produced by a light source 4. The emission light 7 stimulated by the stimulation light 3 in the phosphor layer 1 is collected with a detector 9. The light source 4 and the detector 9, including a representation device 8 and an optical filter 11, together form the scanner 10 which is moved in feed direction V relative to the phosphor layer 1 during the read-out.

The light source 4 has several individual radiation sources 5 and a focussing device 6 which focus the stimulation light beams 12 emanating from the radiation sources 5 onto the phosphor layer 1. The individual radiation sources 5, for example light diodes or laser diodes, are arranged in a line running perpendicularly to the level of the figure. The focussing device 6 has two longish cylinder lenses which run essentially parallel to the individual radiation sources 5 arranged in a line. The divergent stimulation light bundles 12 emanating from the individual radiation sources 5 are bundled by the focussing device 6 on the level of the figure, and meet as a convergent radiation bundle of the stimulation light 3 on the phosphor layer 1. The divergent stimulation light bundles 12 of the individual radiation sources 5 superimpose one another perpendicularly to the level of the figure in such a way that the convergent radiation bundle meets the phosphor layer 1 in the form of a continuous stimulation light line 13 running perpendicularly to the figure level.

The emission light 7 stimulated and emitted in the area of the stimulation light line 13 in the phosphor layer 1 is collected by a detector 9, broken down into locations. For this, the detector 9 has a number of light-sensitive detector elements 14 which are arranged along a line running perpendicularly to the level of the figure. The emission light 7 emitted in the area of the stimulation light line 13 on the phosphor layer 1 is represented by means of a representation device 8 on the light-sensitive detector elements 14 of the detector 9. The detector 9 is preferably in the form of a CCD or photo diode line.

Suitable as the representation device 8 can be preferably, for example, microlenses which are arranged along a line running perpendicularly to the level of the figure, and so parallel to the detector 9 which is of linear design. Alternatively, gradient index lenses are also suitable here, in particular self-focussing lenses which are also arranged in a line running perpendicularly to the level of the figure. The individual areas 15 are preferably represented by the representation device 8 using the scale 1:1 on the light-sensitive surfaces 14 of the detector 9.

Optionally, in the path of the rays between the phosphor layer 1 and the detectors 9, an optical filter 11 is provided which is permeable in the wave length area of the emission light 7 and is essentially impermeable in the wave length area of the stimulation light. In this way it is guaranteed that the collection of the emission light is not falsified by portions of the stimulation light which are reflected on the phosphor layer 1 and can reach the detector 9.

In the example shown, the scanner 10 with a transport mechanism (not shown) is moved in feed direction V over the inactive phosphor layer 1, whereby different linear areas 15 of the phosphor layer 1 are successively stimulated by the stimulation light line 13, and the emission light 7 respectively emitted from the light-sensitive detector elements 14 of the detector 9 is collected, broken down into locations, whereby corresponding emission light signals are produced.

Preferably, the light source 4 is arranged in front of the detector 9 relative to feed direction V, so the scanner 10 runs with the light source 4 in front of it over the phosphor layer 1. In this way it is possible for a larger portion of the stimulation light 3 dispersed in the phosphor layer to be dispersed in the direction of areas 15 which have already been read out, whereas only a smaller portion of the stimulation light 3 is dispersed in the direction of areas 15 of the phosphor layer 1 which have not yet been read out. In this way, losses of intensity and sharpness arising from a dispersal of stimulation light 3 within the phosphor layer 1 can be reduced.

In the example illustrated, the scanner 10 is moved over a fixed phosphor layer 1. The above embodiments also apply, of course, if the scanner 10 is fixed and the phosphor layer 1 which is positioned over the support layer 2 is transported relative to this in the direction of movement P. The same applies similarly for embodiments whereby both the scanner 10 is moved in feed direction V and the phosphor layer 1 is moved in direction of movement P.

While the scanner 10 is moved in feed direction V relative to the phosphor layer 1, the stimulation light line 13 passes over separate areas 15 of the phosphor layer 1 and stimulates these, one after the other, into emitting emission light 7 which is collected by the detector 9 for each of the individual areas 15.

For the movement by the width of an area or section 15, the detector 9 requires a feed period $T_v$. In the course of this movement, the light-sensitive surfaces 14 of the detector 5 collect the emission light 7 emitted from the area 15 over an integration period $T_1$.

The width of the areas 15 in a feed direction V is typically between approx. 10 µm and 500 µm. The transverse extension of the light-sensitive surfaces 14 of the detector 9 perpendicular to the direction of the detector line is typically between approx. 10 µm and 600 µm.

Preferably, the transverse extension of the light-sensitive surfaces 14 is greater than the width of the areas 15 in the feed direction V. The width of the areas 15 is, for example, approximately 50 µm, whereas the transverse extension of the light-sensitive surfaces 14 is approximately 400 µm. The width of an individual area 15 in feed direction V is in this case given by the width of the section of the phosphor layer 1 which the stimulation light line 13 stimulates into emitting emission light 7 as it is fed in feed direction V within the feed period $T_v$. The location break-down in feed direction V, ie. the smallest possible width of a single area 15, is determined here by the width of the stimulation light line 13 in feed direction V.

For better illustration, the areas 15 of the phosphor layer 1 and the light-sensitive surfaces 14 of the detector 9 in FIG. 1 are respectively greatly enlarged and not shown to scale.

Preferably, the integration period $T_1$ of the detector 9, during which the emission light 7 emitted from an area 15 is collected by the detector 9, is shorter than the feed period $T_v$, ie. $T_1 < T_v$. In this way, the so-called thermally generated dark noise which is dependent upon the size of the light-sensitive surfaces 14, the temperature and the integration period $T_1$, is reduced in comparison to the methods established by the prior art, and so the signal/noise ratio is overall increased. Because the detector 9 only passes over one section of the width of the area 15 during collection of the emission light 7 during the integration period $T_1$ information losses caused by the so-called movement blur are also reduced.

Moreover, during the movement of the detector 9 over the phosphor layer 1, a background is collected with the detector 9 when the light source 4 is momentarily switched off, i.e. without irradiating the phosphor layer 1 with stimulation light 3, and this background information is converted into a corresponding background signal. The emission light signals produced by the collection of emission light 7 are then corrected with the background signal, e.g. by subtracting the background signal from the emission light signals. In this way the influence of unwanted ambient light and dark currents in the detector 9 and other sources of interference are eliminated.

The background is collected here during a background integration period $T_U$ which is preferably shorter than the feed period $T_v$. In particular, the collection of both the background and the emission light 7 from an area 15 takes place within the feed period $T_v$. The sum of the background integration period $T_u$ and the integration period $T_1$ is less or the same as the feed period $T_v$: $T_u + T_1 \leq T_v$.

Figure 2:
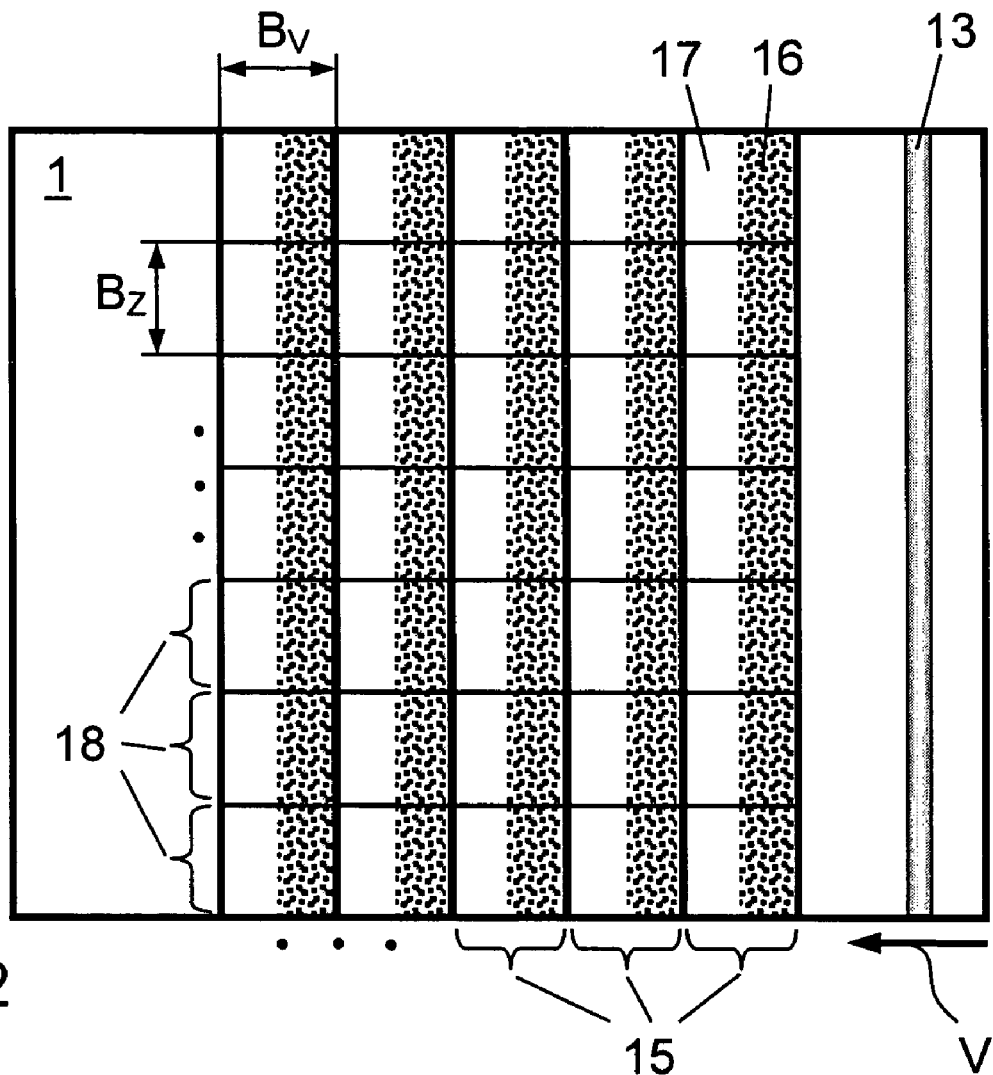
FIG. 2 shows an overhead view of a phosphor layer to be read out.

FIG. 2 shows an overhead view of a phosphor layer 1 to be read out. In the representation chosen here, as in FIG. 1, the individual areas 15 of the phosphor layer 1 have also been greatly enlarged in order to provide better clarity.

A stimulation light line 13 is drawn in on the phosphor layer 1, and the line is moved in feed direction V relative to the phosphor layer 1 with the light source 4 and the detector 9 including the representation device 8 and the filter 11 (see FIG. 1), and in so doing, it passes over the individual areas 15. For the feed by width Bv of an area 15, the detector 9 and the stimulation light line 13 require a specific feed period $T_v$, which, in the case of a constant feed speed, corresponds to the quotient from the width $B_v$ of the individual widths 15 and the feed speed.

The light source 4 is switched on respectively during a stimulation period $T_s$ during which the stimulation light line 13 respectively passes over a first section 16 of the individual areas 15. After the stimulation period $T_s$ has ended, the light source 4 is switched off so that a "virtual stimulation light line" passes over a second section 17 adjoining the first section 16, without irradiating the same with stimulation light. Correspondingly, only the first section 16 is stimulated into emitting emission light by direct irradiation with stimulation light.

At the same time as the propagation of the stimulation light line 13, the aperture of the detector 9 passes over the individual areas 15 of the phosphor layer 1, one after the other. The light sensitive surfaces 14 of the detector 9 arranged in a line thus collects the respective emission light 7 emitted from the linear areas 15. The detector 9 is controlled in such a way that it collects the emission light 7 emitted from the first section 16 during an integration period $T_1$, and then collects the background during a background integration period $T_u$. The sum of the background integration period $T_u$ and the integration period $T_1$ is less or the same here as the feed period $T_v$ which the detector 9 or the light source 4 requires in order to cover a distance which corresponds to the width $B_v$ of the areas 15 in feed direction V: $T_u + T_1 \leq T_v$.

As can be seen in FIG. 2, the individual areas 15 are respectively subdivided into a number of individual elements 18. This subdivision is achieved by the collection of the emission light emitted from the linear areas 15 with a detector 9 of linear design, whereby the width $B_z$ of the elements 18 corresponds to the extension of the individual light-sensitive detector elements 14 in the line direction of the detector 9. The width $B_z$ of the elements 18 is typically between approx. 10 µm and 500 µm, preferably approx. 50 µm.

The emission light 7 emitted from the individual elements 18 of the phosphor layer 1 and collected line by line from the corresponding light-sensitive surfaces 14 of the detector 9 is converted in the detector 9 into corresponding emission light signals which represent the picture information of the latent X-ray pictures which are read out. Similarly, the background collected by the detector 9 is converted into corresponding background signals with which the emission light signals are corrected, e.g. by subtraction.

Figure 3:
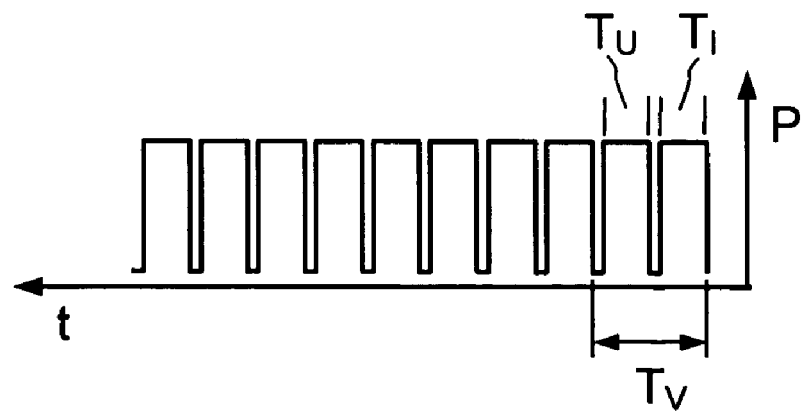
FIG. 3 shows an example for a pulse signal for control of the method in accordance with the invention.

The reading out of the phosphor layer 1 and the collection of the background are preferably controlled by a pulse signal. FIG. 3 shows an example for this type of pulse signal for controlling the method in accordance with the invention. The pulse height P is applied here over the time t.

The pulse signal shown has a periodic sequence of individual rectangular pulses, the respective pulse width of which corresponds to the integration period $T_1$ and the background integration period $T_U$. The sum of the pulse widths of two subsequent pulses is less here than the feed period Tv. With the periodic pulse signal shown here, the feed period Tv corresponds exactly to double the period duration of the pulse signal.

The stimulation period $T_s$ and the integration period $T_1$ can be identical, so that stimulation and collection of the emission light can happen over the same period of time. Preferably, the stimulation and collection of emission light are, however, controlled with two different pulse signals which differ from one another in the width of the pulses (i.e. the stimulation period $T_s$ is then different from the integration period $T_1$, in particular shorter) and/or the phase position of the pulses relative to one another (i.e. the stimulation period $T_s$ begins at an earlier or later point in time than the integration period $T_1$). The stimulation period $T_s$ here is preferably chosen such that, after it has ended, the so-called afterglow of the stimulated phosphor layer has already faded away before the background is collected during the subsequent background integration period $T_u$. In this way it is prevented that the afterglow is also mistakenly collected when the background is collected.

The read-out of the areas 15 of the phosphor layer 1 in FIG. 2 is controlled by the pulse signal shown in FIG. 3 as detailed in the following:

1. At the point in time when the edge of the first pulse ascends, the light source 4 is switched on and the collection of the emission light emitted from this area 15 by the detector 9 is started. From this point in time on, the stimulation period $T_s$ and the integration period $T_1$ are synchronised.

2. During the stimulation period $T_s$ and the integration period $T_1$, the stimulation light line 13 passes over the first section 16 of the area 15, and the emission light emitted is collected by the detector 9.

3. When the stimulation period $T_s$ and the integration period $T_1$ are over, the stimulation light line 13 has arrived at the second section 17 of the area 15.

4. From the point in time when the edge of the first pulse starts to descend onwards, the light source 4 and the detector 9 are switched off and moved further in feed direction V.

5. At the point in time when the edge of the second pulse ascends, the collection of the background information by the detector 9 is started. From this point in time on, the background integration period $T_u$ starts running. The light source remains switched off during this time.

6. When the feed period $T_v$ is over, the process described for the next area 15 to be read out starts all over again.

The emission light signals obtained for the individual areas 15 can be corrected with the background signal obtained over the respective area 15. With this embodiment, a particularly high level of accuracy is achieved for eliminating the background because the influence of ambient light in the directly surrounding area of the respective read-out area 15 is detected and/or dark currents which vary over time correspondingly close in time to the emission light are collected in the detector.

In an alternative embodiment of the method, the background is collected over several, typically 10 to 60, areas 15 and converted into several corresponding background signals which are then averaged out, by means of which an average background signal is obtained. In order to correct the emission light signals obtained for the individual areas 15, the average background signal is then used. With this embodiment the noise portion in the average background signal is greatly reduced in comparison to the noise portions in the individual background signals so that the subsequent correction of the emission light signals leads to overall small noise portions in the corrected emission light signals, and so also to an improved signal/noise ratio.

The invention claimed is:

1. A method for reading out information stored in a phosphor layer, where the phosphor layer is stimulated into emitting emission light by stimulation light produced by a light source and the emission light emitted from one or more linear areas of the phosphor layer is collected by a detector, which comprises a line of detection elements, moved relative to the phosphor layer and converted into corresponding emission light signals, the method comprising:

switching off the light source momentarily at least once during the movement of the detection elements of the detector relative to the phosphor layer between collection of the emission light from successive linear areas of the phosphor layer;

when the light source is switched off, collecting a background at each one of the detection elements of the detector for an entire linear area extending across the phosphor layer during the movement of the detection elements of the detector relative to the phosphor layer with each of the detector elements collecting the background light from a different region of the linear area, said background being caused by ambient light and/or dark currents in the detector, and converting the background into a corresponding background signal for each detection element;

when the light source is switched on, collecting emission light at each one of the detection elements of the detector for the entire linear area extending across the phosphor layer during the movement of the detection elements of the detector relative to the phosphor layer and generating an emission light signal for each detection element with each of the detector elements collecting the emission light from a different region of the linear area;

using the background signal from each detection element to correct an emission light signal from the detection elements to reduce an influence of the ambient light and/or dark currents in the detector;

switching on the light source for a stimulation period $T_s$ and collecting the emission light emitted from the linear areas with the detector during an integration period $T_1$; and collecting the background at each one of the detection elements of the detector for an entire linear area extending across the phosphor layer during a background integration period $T_u$ after a delay after the stimulation period $T_s$ has ended to allow afterglow to fade before collection of the background.

2. The method in accordance with claim 1, wherein the background integration period ($T_u$) is smaller than a feed period ($T_v$) for the movement of the detector by a width ($B_v$) of one of the linear areas of the phosphor layer in feed direction (V) of the detector.

3. The method in accordance with claim 2, further comprising collecting the emission light emitted from the linear areas with the detector during an integration period ($T_1$) which is the same as the background integration period ($T_u$).

4. The method in accordance with claim 1, wherein the stimulation period ($T_s$) is shorter or the same as the integration period ($T_1$).

5. The method in accordance with claim 1, further comprising moving the detector and/or the light source relative to the phosphor layer with a constant feed speed.

6. The method in accordance with claim 5, further comprising configuring a feed period ($T_v$) to correspond to the quotient of a width ($B_v$) of the linear areas and the feed speed.

7. The method in accordance with claim 1, wherein the one or more linear areas of the phosphor layer are respectively in the form of a line, whereby the detector and/or the light source are moved perpendicularly to the longitudinal extension of the line relative to the phosphor layer.

8. The method in accordance with claim 1, wherein the collection of the background and the collection of the emission light are controlled by a pulse signal (P), whereby the background integration period ($T_u$) and the integration period ($T_1$) are given by the respective pulse width of the individual pulses of the pulse signal (P).

9. The method in accordance with claim 8, wherein the pulse signal (P) is a periodic pulse signal which has a period duration which corresponds to half a feed period ($T_v$).

10. The method in accordance with claim 1, further comprising, during a movement of the detector by several widths (Bv) in feed direction (V), collecting the background several times and converting the background into several corresponding background signals, wherein the background signals are averaged out, whereby an average background signal is obtained, and the average background signal is used for correcting the emission light signals of the one or more linear areas of the phosphor layer.

11. A method for reading out information stored in a phosphor layer, where the phosphor layer is stimulated into emitting emission light by stimulation light produced by a light source and the emission light emitted from one or more linear areas of the phosphor layer is collected by a detector, which comprises a line of detection elements, moved relative to the phosphor layer and converted into corresponding emission light signals, the method comprising:
  switching off the light source momentarily at least once during the movement of the detection elements of the detector relative to the phosphor layer between collection of the emission light from successive linear areas of the phosphor layer;
  when the light source is switched off, collecting a background at each one of the detection elements of the detector for an entire linear area extending across the phosphor layer during the movement of the detection elements of the detector relative to the phosphor layer with each of the detector elements collecting the background light from a different region of the linear area, said background being caused by ambient light and/or dark currents in the detector, and converting the background into a corresponding background signal for each detection element;
  when the light source is switched on, collecting emission light at each one of the detection elements of the detector for the entire linear area extending across the phosphor layer during the movement of the detection elements of the detector relative to the phosphor layer and generating an emission light signal for each detection element with each of the detector elements collecting the emission light from a different region of the linear area; and
  using the background signal from each detection element to correct an emission light signal from the detection elements to reduce an influence of the ambient light and/or dark currents in the detector;
  collecting the background at each one of the detection elements of the detector for an entire linear area extending across the phosphor layer during a background integration period ($T_u$) which is smaller than a feed period ($T_v$) for the movement of the detector by the width ($B_v$) of one of the linear areas of the phosphor layer in feed direction (V) of the detector;
  collecting the emission light emitted from the linear areas with the detector during an integration period ($T_1$);
  switching on the light source for a stimulation period ($T_s$), which is shorter than the integration period ($T_1$), to allow afterglow to fade before collection of the background.

12. A method for reading out information stored in a phosphor layer, where the phosphor layer is stimulated into emitting emission light by stimulation light produced by a light source and the emission light emitted from one or more linear areas of the phosphor layer is collected by a detector, which comprises a line of detection elements, moved relative to the phosphor layer and converted into corresponding emission light signals, the method comprising:
  switching off the light source momentarily at least once during the movement of the detection elements of the detector relative to the phosphor layer between collection of the emission light from successive linear areas of the phosphor layer;
  when the light source is switched off, collecting a background at each one of the detection elements of the detector for an entire linear area extending across the phosphor layer during the movement of the detection elements of the detector relative to the phosphor layer with each of the detector elements collecting the background light from a different region of the linear area, said background being caused by ambient light and/or dark currents in the detector, and converting the background into a corresponding background signal for each detection element;
  when the light source is switched on, collecting emission light at each one of the detection elements of the detector for the entire linear area extending across the phosphor layer during the movement of the detection elements of the detector relative to the phosphor layer and generating an emission light signal for each detection element with each of the detector elements collecting the emission light from a different region of the linear area; and
  using the background signal from each detection element to correct an emission light signal from the detection elements to reduce an influence of the ambient light and/or dark currents in the detector;
  switching on the light source for a stimulation period ($T_s$) and collecting the emission light emitted from the linear areas with the detector during an integration period ($T_1$); and
  collecting the background at each one of the detection elements of the detector for an entire linear area extending across the phosphor layer during a background integration period ($T_u$) that is started after a delay after the stimulation period ($T_s$) has ended to allow afterglow to fade before collection of the background.

* * * * *